US010625442B2

(12) United States Patent
Reuber et al.

(10) Patent No.: US 10,625,442 B2
(45) Date of Patent: Apr. 21, 2020

(54) APPARATUS AND METHOD FOR THE PRODUCTION OF A PARTICLE FOAM PART

(71) Applicant: Kurtz GmbH, Kreuzwertheim (DE)

(72) Inventors: Norbert Reuber, Bergrothenfels (DE); Bernd Leimeister, Bischbrunn (DE)

(73) Assignee: Kurtz GmbH, Kreuzwerheim (DE)

( * ) Notice: Subject to any disclaimer, the term of this patent is extended or adjusted under 35 U.S.C. 154(b) by 632 days.

(21) Appl. No.: 15/103,887

(22) PCT Filed: Dec. 19, 2014

(86) PCT No.: PCT/EP2014/078646
§ 371 (c)(1),
(2) Date: Jun. 13, 2016

(87) PCT Pub. No.: WO2015/097075
PCT Pub. Date: Jul. 2, 2015

(65) Prior Publication Data
US 2016/0311134 A1 Oct. 27, 2016

(30) Foreign Application Priority Data
Dec. 23, 2013 (DE) .......................... 10 2013 114 799

(51) Int. Cl.
*B29C 44/44* (2006.01)
*B29C 44/34* (2006.01)
(Continued)

(52) U.S. Cl.
CPC .......... *B29C 35/049* (2013.01); *B29C 33/048* (2013.01); *B29C 35/002* (2013.01);
(Continued)

(58) Field of Classification Search
CPC ... B29C 35/049; B29C 33/048; B29C 35/002; B29C 44/445; B29C 44/60; B29K 2105/048; B29K 2075/00
See application file for complete search history.

(56) References Cited

U.S. PATENT DOCUMENTS 4,615,849 A 10/1986 Hahn
4,685,872 A 8/1987 Erlenbach
(Continued)

FOREIGN PATENT DOCUMENTS

DE 3243632 A1 5/1984
DE 3831600 C1 8/1989
(Continued)

OTHER PUBLICATIONS

English Translation of International Preliminary Report on Patentability, German original dated Jun. 28, 2016, for PCT/EP2014/078646, filed Dec. 19, 2014. Ten pages.
(Continued)

Primary Examiner — Robert J Grun
(74) Attorney, Agent, or Firm — HoustonHogle LLP

(57) ABSTRACT

The present invention relates to an apparatus and a method for the production of a particle foam part. The apparatus has a mold 2 with a mold cavity 3, a steam generator 12 to generate steam for feeding into the mold cavity for the thermoplastic welding into a particle foam part of foam particles present in the mold cavity 3, a feed pipe 10, 11 for the feeding of steam to the mold, wherein a controllable steam valve 13, 14 is provided in the feed pipe, and a pressure sensor 15, 16 is located in the area between the steam valve and the mold, in order to measure the pressure of the supplied steam.
A control device 23 controls pressure over time according to to a predetermined profile, wherein the profile has a ramp, in
(Continued)

Figure 1:
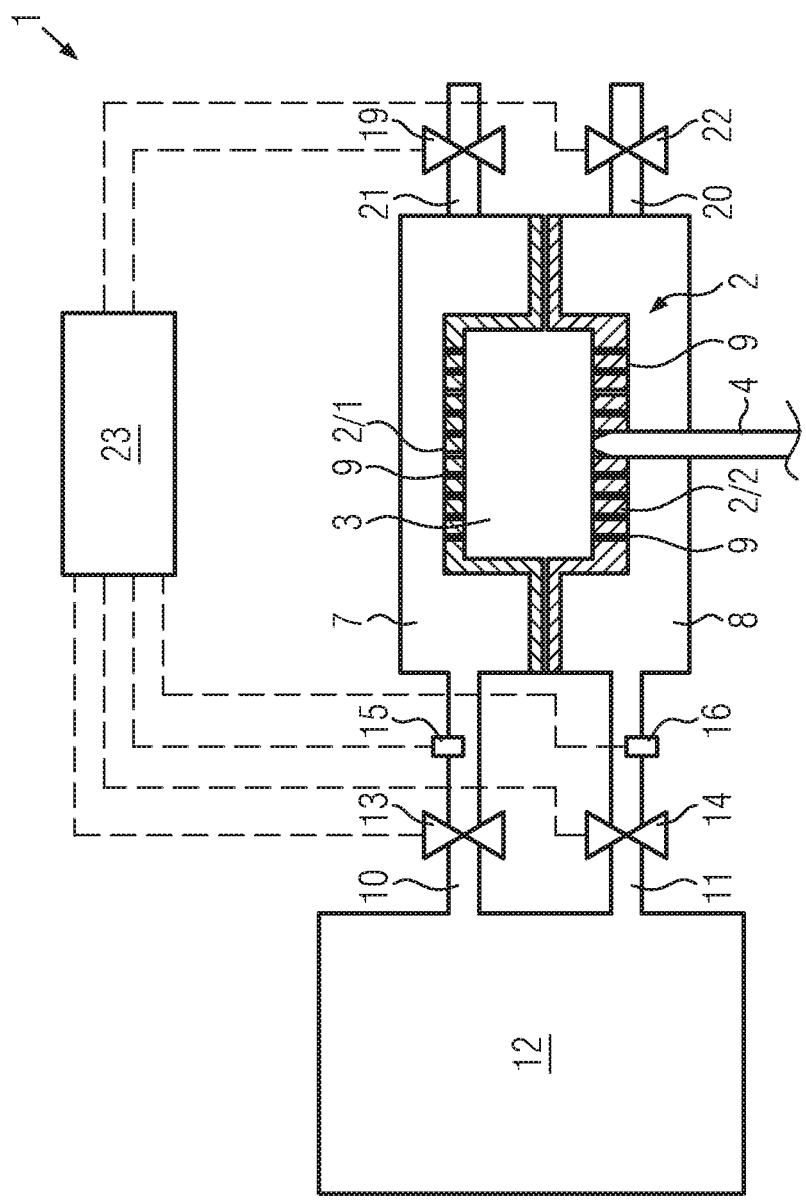

order to increase pressure gradually within a predetermined period of time from an initial value to an end value.

14 Claims, 3 Drawing Sheets

(51) Int. Cl.
    *B29C 35/04* (2006.01)
    *B29C 44/60* (2006.01)
    *B29C 33/04* (2006.01)
    *B29C 35/00* (2006.01)
    *B29K 75/00* (2006.01)
    *B29K 105/04* (2006.01)

(52) U.S. Cl.
    CPC ............ *B29C 44/445* (2013.01); *B29C 44/60* (2013.01); *B29K 2075/00* (2013.01); *B29K 2105/048* (2013.01)

(56) References Cited

U.S. PATENT DOCUMENTS

| | | | |
|---|---|---|---|
| 4,800,050 A | 1/1989 | Hahn et al. | |
| 5,711,905 A | 1/1998 | Behl | |
| 5,858,288 A | 1/1999 | Bullard | |
| 2012/0329892 A1 | 12/2012 | Prissok et al. | |
| 2016/0001476 A1* | 1/2016 | Sommer | B29C 44/3496 264/54 |

FOREIGN PATENT DOCUMENTS

| | | |
|---|---|---|
| DE | 4236081 A1 | 4/1994 |
| DE | 19637347 A1 | 4/1997 |
| DE | 19637349 A1 | 4/1997 |
| DE | 202006009569 U1 | 9/2006 |
| EP | 0224103 A2 | 6/1987 |
| EP | 0259597 A2 | 3/1988 |
| EP | 0485714 B1 | 5/1994 |
| EP | 2671633 A1 | 12/2013 |
| JP | S6268730 A | 3/1987 |
| JP | H0811148 A | 1/1996 |
| JP | 11-268071 | 10/1999 |
| WO | 9420568 A1 | 9/1994 |

OTHER PUBLICATIONS

German Search Report for Application No. DE 10 2013 114 799.2 filed Dec. 23, 2013, dated Mar. 11, 2014. Three pages.
International Search Report for PCT/EP2014/078646 filed Dec. 19, 2014, dated May 28, 2015. Three pages.

\* cited by examiner

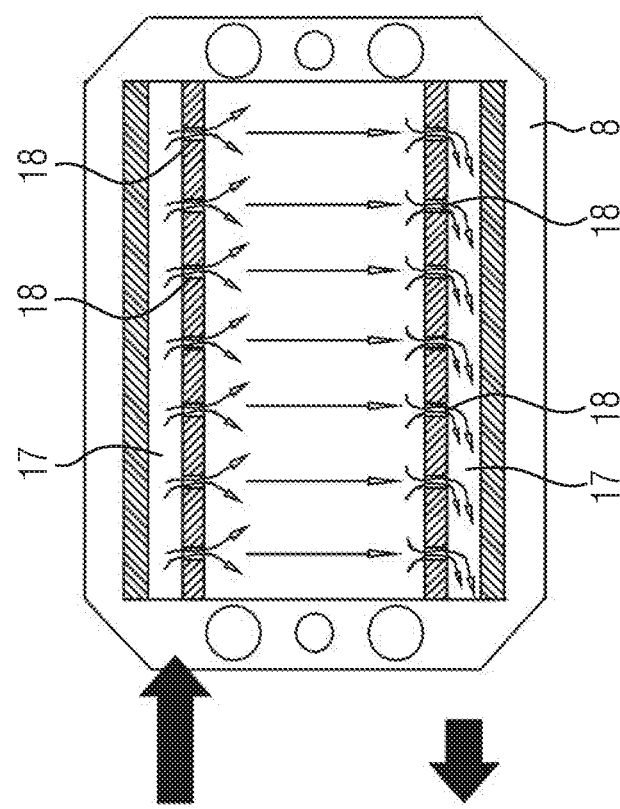
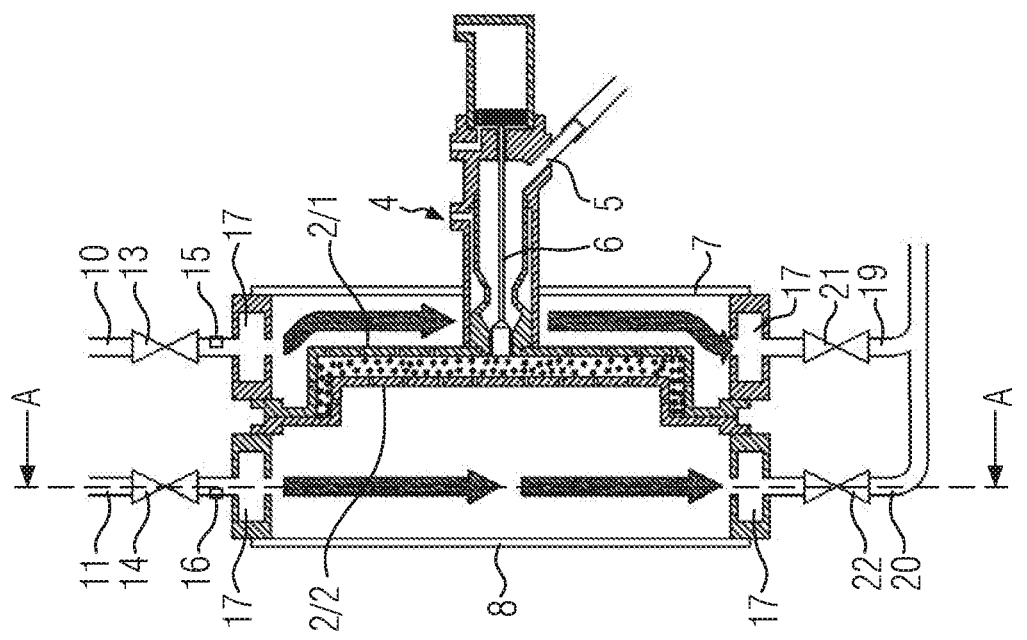
FIG. 3
FIG. 2

APPARATUS AND METHOD FOR THE PRODUCTION OF A PARTICLE FOAM PART

RELATED APPLICATIONS

This application is a § 371 National Phase Application of International Application No. PCT/EP2014/078646, filed on Dec. 19, 2014, which claims priority to German Application No, 10 2013 114 799.2, filed on Dec. 23, 2013, both of which are incorporated herein by reference in their entirety.

The present invention relates to an apparatus and a method for the production of a particle foam part.

Examples of apparatus for the production of particle foam parts are known from DE 38 31 600 C1 and the German utility model DE 20 2006 009 569 U1. Particle foam parts are produced by filling a mold cavity of a mold with pre-expanded foam particles and welding the latter together by feeding in hot steam. The foam particles may be impregnated with a blowing agent which, during welding, effects additional expansion of the foam particles. The foam particles consist, for example, of expandable polystyrol EPS, expandable polyethylene EPE, expandable polypropylene EPP or E-copolymers.

DE 196 37 349 A1 discloses an apparatus for the sintering of foamable plastic material. The plastic material used is pre-expanded polystyrol, which is fed from a supply tank to a sinter chamber. The apparatus for production of the plastic part has two mold parts, which bound foaming and sinter chambers. Slides may also be provided, so that mold parts with undercut may be formed. The mold parts and the slides have steam chambers. From the steam chambers, a multiplicity of small passages lead to the interior of the sinter chambers. Each steam chamber is equipped with sensors which are connected to a controller. Via the sensors, the temperature at the sinter chamber prevailing in the area of each individual steam chamber, the foaming pressure prevailing there, and the steam pressure in the sinter chamber are passed on to the controller. The controller is used to preset a target value for the temperature, the foaming pressure and the steam pressure for each steam chamber individually.

DE 196 37 347 A1 discloses a similar method for the production of a casting, wherein firstly a plastic part is foamed.

Described in EP 224 103 B1 is an adaptive control process for the foaming and sintering of plastic bodies made of pre-expanded plastic material. The plastic parts produced in the sintering process may be fed to a quality measurement process. The quality parameters are molding accuracy, moisture content, bending strength and surface roughness or strength. With the aid of the quality parameters and the process of statistical variation of the control criteria, these factors may be set automatically at the optimum level.

EP 259 597 B1 relates to a development of this method wherein steam is used with a steam temperature of 5-25° C. above the sintering temperature of the plastic material, and with a high preset degree of saturation, so that the steam temperature lies around 5° C. above the steam saturation temperature.

DE 32 43 632 A1 relates to a method and an apparatus for the sintering of particle foam bodies. With this method it should be possible to make different moldings from a variety of foamable plastics. Since the materials are subject to considerable tolerances in delivery and differ e.g. in moisture and blowing gas content depending on pre-expansion and intermediate storage, parameters are determined from temperature and pressure values measured during processing, and used for ongoing determination of default values and their correction.

DE 42 36 081 A1 relates to a further method for the production of molded parts from foamed plastic. In this method, a mold is used which has mold cavity forming walls of material with poor thermal conductivity or which are suitably coated. The corresponding mold may be made of plastic. In particular it is a plastic with good heat-conducting particles and/or fibers, which may for example be of metal.

Also known are particle foam parts based on thermoplastic expandable polyurethane ((ETPU) (e.g. WO 94/20568 A). These particle foam parts are made from expandable, particle-shaped thermoplastic ETPU. To produce the molded part, the pre-expanded ETPU particles, where applicable pressure-charged by a gas, are fed into a mold and heated until the particles are welded together. Heating is effected through the application of steam. If necessary, pressure-charging of the particles may take place before molded part production. After demolding, the molded part should be conditioned to a constant weight. Conditioning is effected at temperatures of 20-120° C. The thermoplastic ETPU particles may be provided with a blowing agent, such as for example butane or $CO_2$. Solid blowing agents, which split off gas, may also be used, such as azole carbonamide or toluol sulphonic acid hydrazide.

The advantage of particle foam parts from particles based on thermoplastic polyurethane (ETPU particles) lies in their high elasticity when compared to particle foam parts based on other plastics, in particular polystyrol and polypropylene.

Foam particles based on polyurethane have high mutual adhesive forces and high elasticity. As a result of this, individual foam particles already stick together and form lumps in loose bulk.

The invention is based on the problem of creating an apparatus and a method for the production of particle foam parts from polyurethane-based (eTPU) foam particles, with which particle foam parts of high quality may be made with repeatable reliability.

A further problem on which the invention is based is that of creating an apparatus and a method for the production of a particle foam part from foam particles, in which large-volume particle foam parts of high quality may be made with repeatable reliability.

One or more of the problems are solved by the methods defined in the independent claims and the apparatus defined in the independent claims. Advantageous developments of the invention are set out in the respective dependent claims.

A method according to the invention for the production of a particle foam part comprises the following steps:

Feeding of foam particles into a mold cavity of a mold
Thermoplastic welding of the foam particles in the mold to form a particle foam part, under a supply of steam. The method is characterized by the fact that the pressure of the steam is increased gradually from an initial value to an end value according to a predetermined profile with a ramp within a predetermined interval of time.

The inventors of the present invention have found that sometimes, immediately after the feeding of steam into the mold cavity of the mold, sections of the foam particle filling of eTPU weld and skin over and so prevent the further flow of steam in certain areas. It is assumed that, on account of the high elasticity of the ET-polyurethane-based (eTPU) foam particles and their adhesive surface, locally compacted sections occur in the foam particle filling of the mold, which weld and skin over more rapidly. In this way, particle foam parts are produced with welding of varying strength in certain areas. This represents a considerable quality defect.

Figure 5:
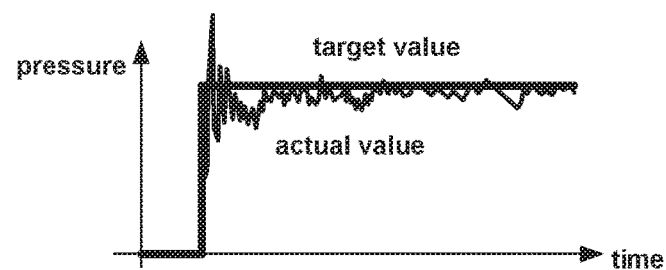

In conventional methods of producing a particle foam part, the steam pressure is adjusted abruptly from 0 to a predetermined target value. FIG. 5 shows in a diagram the target value (thick line) and the actual value (thin line). The sudden increase in steam pressure leads to a correspondingly abrupt pressurization of the foam particles in the mold. If the mold is filled with uneven density, the areas with differences in the tightness of packing are pressurized by steam at different pressure. This can lead to localized welding and skinning which in turn prevents welding of other areas. It should also be taken into account that, with abrupt steam pressurization, the air in the spaces between the foam particles is heated rapidly. This increases the volume of the air and delays its driving out from the mold. Air is also a much better insulator than steam, leading to a serious delay in the heat fed in with the steam reaching the areas of foam particle filling which are still filled with air.

Moreover, an abrupt increase in the target value often leads to an overswing of the actual value (see FIG. 5), so that for a short time and especially once again localized, steam with an excessive pressure and therefore excessive temperature is present.

In the present invention, on the other hand, the pressure of the steam is regulated according to a predetermined profile with a ramp, in order to increase pressure gradually from an initial value to an end value within a predetermined period of time. Through the provision of such a ramp, the steam is first supplied at low pressure, which is gradually increased, so that air present in the spaces between the foam particles may be evenly driven out.

The steam is usually supplied as dry saturated steam. The temperature of the dry saturated steam is determined by the boiling point curve of steam and thus correlates with pressure. Through the gradual rise in pressure, a gradual rise in temperature of the steam is also effected. Some of the steam condenses on the mold surface, so that the saturated steam becomes wet steam.

With the method according to the invention, the quality of particle foam parts may be raised considerably, especially if they are made from polyurethane-based foam particles, and/or large-volume particle foam parts are produced. Moreover, methods in which the foam particles are put under pressure through the filling process (crack split filling, pressure filling or counter-pressure filling) can be used reliably with high-quality results.

Although the pressure of the steam is increased only gradually, it has been found that the whole process of welding the filling takes no longer than with conventional apparatus. In individual cases it is even possible to obtain a reduction in cycle time. This is attributed to the fact that, in the course of feeding steam at low pressure, the air still present in the mold is not heated so rapidly and may therefore be driven out of the mold more easily and more quickly. In addition, the foam particles are heated slowly, so that the spandrel spaces between the foam particles remain open long enough for air and steam to flow through easily.

Large-volume particle foam parts have a volume of at least 0.5 m³, in particular at least 1 m³ and preferably at least 1.5 m³.

It has also been found that the method according to the invention is suitable for the production of particle foam parts from other materials such as polyurethane, in particular from polypropylene, polyethylene and polystyrol, and in particular is very advantageous in the case of particle foam parts which are large-volume and/or very heavily mechanically compressed through crack split filling, pressure filling or counter-pressure filling, since the air present in the mold may be removed quickly and moreover heating and welding of the particle foam part takes place evenly over the large volume. Large-volume particle foam parts have a volume of at least 0.5 m³ and in particular of at least 1 m³. The mold used in the production of these large-volume particle foam parts has a correspondingly high volume in the closed state.

The ramp is preferably a continuous differentiable function of pressure over time. This means that the ramp contains no steps or peaks which might lead to overswings in the control process. With such a ramp, the actual value is able to follow the target value curve very precisely. At the initial value and the end value it is not absolutely necessary for the ramp to be continuously differentiable.

The ramp is preferably so designed that the pressure of the steam is varied at an average rate of 0.01 bar/s to 2 bar/s.

The pressure of the steam is varied during the ramp preferably at an average rate of no more than 2 bar/s. In particular the average rate is no greater than 1.5 bar/s or 1 bar/s.

Preferably the average rate of the ramp is greater than 0.02 bar/s, in particular greater than 0.04 bar/s. The particle foam part is made preferably of foam particles which have ET-PU (polyurethane), EPS (polystyrol), EPP (polypropylene) or E-copolymers, or are mainly from one of these materials.

Preferably a mold is used which has two mold halves, with each mold half being mounted in a separate steam chamber. Steam is fed into each steam chamber by means of a steam valve connected to the control device. Fitted in each steam chamber or a corresponding feed pipe is in each case a pressure sensor, which is connected to the control device. Each steam chamber has a condensate valve to take steam or condensate away from the steam chamber. Firstly, steam is fed to the first of the two mold halves via the corresponding first steam chamber with the predetermined profile, while in the second steam chamber the condensate valve is opened so that air expelled from the mold cavity may flow out through the second steam chamber. Next, steam is fed to the second mold half via the second steam chamber with the predetermined profile and the condensate valve in the first steam chamber is opened so that the remaining air may be expelled from the mold cavity and can flow away.

With the predetermined profile, steam may be fed to the mold cavity for rinsing the mold cavity and/or for autoclaving the foam particles present in the mold cavity. The profile with the ramp is especially advantageous in connection with rinsing the mold cavity, since at the same time air is driven out from the mold cavity very efficiently.

The ramp is preferably a linear rising ramp, a single or multiple curved ramp, a stepped, parabolic or exponentially rising ramp.

The apparatus for the production of a particle foam part comprises:
 A mold with a mold cavity
 A steam generator to generate steam for feeding into the mold cavity for thermoplastic welding of foam particles present in the mold cavity, to form a particle foam part
 A feed pipe for feeding steam to the mold, wherein the feed pipe has a controllable steam valve
 A pressure sensor located in the area between the steam valve and the mold in order to measure the steam pressure.

The apparatus is characterized by the provision of a control device for controlling the pressure (control variable) according to a predetermined profile (reference variable)

over time, wherein the control device is connected to the pressure sensor and the steam valve, and the predetermined profile has a ramp so that, within a predetermined interval of time, pressure may be increased gradually from an initial value to an end value.

The control device is in the form of a P controller, PI controller, PD controller or PID controller. A fuzzy controller and/or a cascaded controller may also be provided.

The mold may be encompassed by two or more steam chambers, wherein steam may be fed to each steam chamber by means of a steam valve connected to the control device, and a pressure sensor connected to the control device is provided in each steam chamber or in a corresponding feed pipe, wherein the control device is designed to control pressure (control variable) in all steam chambers according to a predetermined profile (reference variable) over time.

The mold has at least two mold halves, with each mold half being located in a separate steam chamber. Other mid parts are e.g. retractable cores, for each of which a separate steam chamber is provided.

Preferably each steam chamber has a condensate valve controllable by the control device, for the removal of steam from the respective steam chamber.

The mold is provided with several nozzles, wherein at least one nozzle leads into each steam chamber.

The invention is explained in detail below, by way of example, with the aid of the drawings. The drawings show in simplified schematic form in:

FIG. 1 an apparatus for the production of a particle foam part in a block diagram FIG. 2 a section through two steam chambers containing a mold FIG. 3 a section along the line A-A in FIG. 2

FIGS. 4a-4d diagrams of different ramps, and

FIG. 5 the course of a target value and actual value of the pressure with which the steam is supplied, in an apparatus according to the prior art.

An apparatus 1 for the production of a particle foam part has a mold 2 made up of two mold halves 2/1 and 2/2 (FIG. 1). The mold halves 2/1 and 2/2 are generally a positive mold and a negative mold (not shown), in order to give a predetermined shape to the particle foam part to be produced. A mold cavity 3 is bounded by the mold 2 and the positive mold and negative mold located therein.

Leading into the mold cavity 3 is a filling injector 4, by means of which foam particles from a material container may be fed via a pipe into the mold cavity 3. Provided at the material container and/or at the pipe is preferably a water or steam supply for wetting the foam particles to be conveyed to the mold. In this way, the conveyance properties of the eTPU foam particles may be significantly improved, and any blockage of the pipe or the filling injector is prevented. Connections may also be provided at several points along the conveyance path, in order to supply water or steam.

The filling injector 4 has a connection 5 for the feeding of blowing air, with which the foam particles can be conveyed into the mold cavity (FIG. 2). An opening of the filling injector 4 leading into the mold cavity 3 may be closed by means of a punch 6.

The two mold halves 2/1 and 2/2, on their sides facing away from one another, are respectively encompassed by a first steam chamber 7 and a second steam chamber 8. The mold halves 2/1 and 2/2 have several nozzles 9 which, from the inner part of the steam chambers 7, 8, open out into the mold cavity 3.

The mold halves and the corresponding steam chambers may be moved together by a mechanism, and may be moved apart to open the mold cavity 3.

The mold 2 may be in the form of a so-called crack splitting mold, which is not completely closed during filling with foam particles, but instead is closed completely only after filling, with the foam particle filling being compacted in the mold cavity 3. The mold 2 may however also be provided for so-called pressure-charging, in which the foam particles are fed into the mold under pressure, so that with a subsequent reduction in pressure, the foam particles expand in the mold.

Each of the two steam chambers 7, 8 is connected by a feed pipe 10, 11 to a steam generator 12. The steam generator 12 provides dry saturated steam. Each of the feed pipes 10, 11 has a steam valve 13, 14, which may be used to control the supply of steam to the respective steam chamber 7, 8. In the area between the steam valves 13, 14 and the mold 2, there is in each case a pressure sensor 15, 16. In the present embodiment, the pressure sensors are provided in the feedpipes 10, 11. They may be similarly located in the first or second steam chamber 7, 8.

FIGS. 2 and 3 show that the steam chambers 7, 8 have on the input side and the output side in each case a distribution channel 17, which extends over the entire length of the respective steam chamber 7, 8 and has several openings 18 distributed evenly over the length, so that the steam flow is distributed evenly over the length of the steam chambers 7, 8.

On the output side, the distribution channels 17 lead in each case into a condensate pipe 19, 20, in each of which a condensate valve 21, 22 is provided.

The steam valves 13, 14, the pressure sensors 15, 16 and the condensate valves 21, 22 are each connected to a control device 23 (FIG. 1).

The operation of the apparatus 1 for the production of a particle foam part is explained below. Firstly the mold cavity 3 of the mold 2 is filled with foam particles via the filling injector 4. This may be effected by means of the crack split process or by pressure filling. After filling, the two mold halves of the mold are closed.

Next, the steam chambers 7, 8 are rinsed with steam, by opening not only the steam valves 13, 14, but also the condensate valves 21, 22 simultaneously. In this way, air present in the steam chambers 7, 8 is forced out of the steam chambers into the condensate pipes 19, 20.

After the two steam chambers 7, 8 have been rinsed with steam, all steam valves 13, 14 and condensate valves 21, 22 are closed.

Next, the steam valve 13 of the feed pipe 10 to the first steam chamber 7, and the condensate valve 22 in the condensate pipe 20 of the second steam chamber 8, are opened. The steam therefore flows from the steam generator 12 into the first steam chamber 7, through the nozzles 9 of the first mold half 2/1 into the mold cavity 3, and through the nozzles 9 of the other mold half 2/2 into the second steam chamber 8 and from there into the condensate pipe 20. In this way, the mold cavity 3 is rinsed with steam. The opening of the steam valve 13 and of the condensate valve 21 is controlled by the control device 23 in such away that the pressure measured by the pressure sensor 15 in the feed pipe 10 to the first steam chamber 7 follows a predetermined ramp. In this way, the pressure of the steam in the mold cavity 3 is increased gradually. This rinsing of the mold, in which the steam flows from one steam chamber into the other steam chamber, is also described as cross-steaming. The duration of cross-steaming and the end value of the pressure reached at the end of the ramp are set according to the material and the size of the particle foam part. Typical end values of pressure for cross-steaming are 0.2 to 0.5 bar for ET polystyrol, 2 to 4 bar for ET-polypropylene, and 1.2 to 1.8 bar for ET-polyurethane. For small parts, cross-steaming lasts for around 3 to 5 seconds, and for large parts (several m$^3$), around 10 to 20 seconds. For a large part, the duration of the ramp extends to around 10 seconds, while on the other hand, for a small part, the ramp is travelled over in around 1 to 2 seconds.

The following parameters are suitable for the production of an E-polystyrol block with a volume of approx. 7 m$^3$:

End pressure 0.4 bar

The duration of cross-steaming is 20 s, of which the ramp takes up 10 s. The mean variation in pressure during the ramp is therefore 0.04 bar/s.

For the production of a small part made of E-polypropylene (approx. 15 cm$^3$), the following parameters are suitable for the cross-steaming:

End pressure 3 bar

The duration of cross-steaming is 3 s, of which the ramp takes up 1.5 s. Here, the mean variation in pressure during the ramp is 2 bar/s.

If the cross-steaming from the first steam chamber in the direction of the second steam chamber 8 is concluded, then all valves 13, 14, 21, 22 are closed again. A second cross-steaming is then carried out from the second steam chamber 8 through the mold cavity 3 into the first steam chamber 7, wherein the steam valve 14, by which steam is fed to the second steam chamber 8, and the condensate valve 21, are opened, by which steam is carried away from the first steam chamber 7. The opening of these two valves 14, 21 is again controlled by the control device 23 in such a way that pressure is increased gradually by a predetermined ramp (FIG. 4a-4d). In this second cross-steaming, the final pressure is generally slightly higher than in the first cross-steaming (around 0.1 to 0.5 bar more). This is expedient since, after the first cross-steaming, the foam particles are already partly welded, so that the flow resistance is greater.

As an option, before cross-steaming, steam may be fed before or during the moving together and compaction of the foam particles. The steam is then supplied with the mold cavity initially open (crack-split), in order to force out the air present in the spandrel spaces. The steaming step is described as crack steaming.

Steaming under partial vacuum in the mold (less than 0.5 bar absolute pressure) has turned out to be another advantageous steaming variant. For this purpose, by means of an additional pump (not shown), air is sucked out of the mold 2 through one or both condensate pipes 19, 20. The reduced air volume between the particles ensures good heat transfer. Due to the additional pressure gradient, it is also possible for steam to flow through foam particles which are already mechanically compressed (for example by crack split filling or counter-pressure filling). On account of the reduced pressure, the steam temperature remains low, so that the outer skin of the molded part is not welded gas-tight prematurely, before the inner zones are welded.

FIGS. 4a-4d show different ramps, by which pressure may be increased at the start of cross-steaming. The ramp according to FIG. 4a has a circle-segment-shaped curve. The ramp according to FIG. 4b rises in a straight line. Both functions are continuously differentiable in the area of the ramp, i.e. there are no jumps and edges. Only at the start (FIG. 4a, 4b) of the ramp, as also at the end (FIG. 4b) is there intermittency in the first derivation. Such a continuously differentiable function may be controlled very precisely.

This may be done for example using a simple proportional controller (P controller). Preferably however a proportional-differential controller (PD controller) and in particular a proportional-differential-integral controller (PID controller) is used.

Figures 4A, 4B, 4C, 4D:
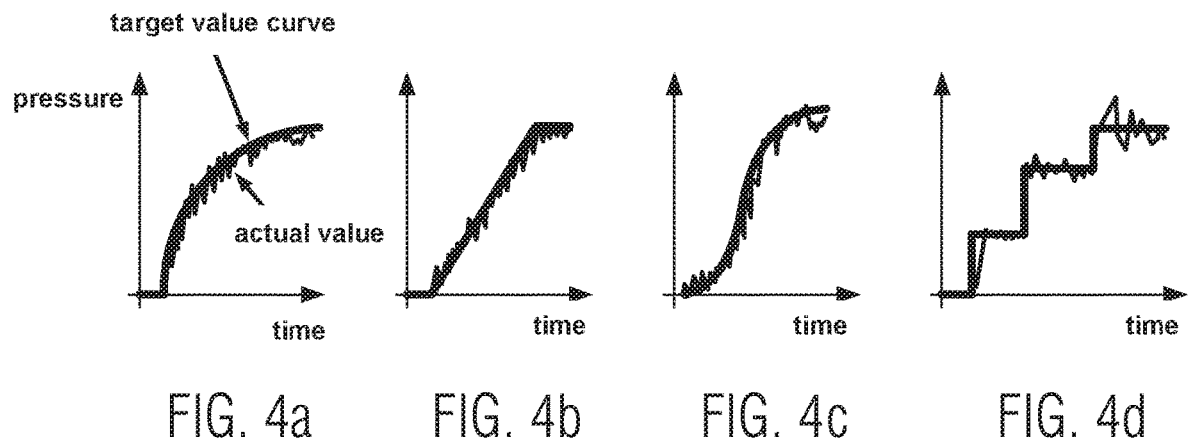

The ramp according to FIG. 4c has two opposite curves, with this ramp being continuously differentiable both at the start and at the end of the ramp. This is therefore a completely smooth function, which may be controlled very precisely.

FIG. 4d shows a ramp with several steps. Control of this kind is in principle also possible. However, the individual steps are not continuously differentiable.

At each step it is therefore possible for overswings to occur. Since the individual steps are distinctly smaller than in the prior art (cf. FIG. 5), the overswings are correspondingly smaller.

All these ramps have in common the fact that, at the start, steam is fed at low pressure and therefore low temperature, which considerably facilitates flow through the mold cavity and the expulsion of air.

The mean rate at which pressure is increased during the ramp is preferably less than 2 bar/s, in particular less than 1.5 bar/s and preferably less than 1 bar/s.

After cross-steaming in both directions, the condensate valves 21, 22 are closed and the two steam valves 13, 14 are opened or held open. In this way, steam is fed through both mold halves of the mold 2 into the mold cavity 3, so that the particle foam contained therein is completely welded. This step is also described as autoclaving.

During autoclaving, the set pressures are generally higher than for cross-steaming. Typical pressure values for autoclaving lie in the range 1-1.2 bar for E-polystyrol, in the range 3.5-5 bar for E-polypropylene, and in the range of 2.2-3.5 bar for E-polyurethane. The duration of the autoclaving stage depends on the volume of the particle foam part to be produced and the mass of the mold, and may lie between a few seconds and up to a minute.

In principle it is also possible during autoclaving to increase pressure firstly using a ramp. Since, however, immediately before autoclaving, there should no longer be any air in the mold, and also the foam particles are preheated by cross-steaming, the effect of the ramp in autoclaving is much less pronounced than in the case of cross-steaming.

In the alternative described above, that of crack steaming, i.e. the feeding of steam while the mold is still somewhat open, it makes a great deal of sense to allow pressure to rise according to a ramp, since at this stage there is much air in the mold.

After autoclaving, the particle foam part produced is cooled down. This involves spraying of the mold halves with water. Through condensation of the steam present in the mold cavity, the volume of the steam and therefore the pressure on the particle foam part is reduced. In addition, a partial vacuum or vacuum may be applied, so that the evaporation of the condensed water leads to a further cooling effect. The mold is then opened and the particle foam part removed.

The process of producing a particle foam part may then begin afresh.

The method described above avoids the introduction of too much energy at once, in particular at the beginning when there is air in the mold, which may lead to skinning over of the foam part, even though there is still air in the inner zone and the foam particles in the inner zone are not yet welded. The method leads to a very efficient forcing of air out of the spandrel spaces. Due to the rapid and even distribution of steam in the mold cavity, heat is conducted quickly, resulting in the whole mold cavity having substantially the same temperature and leading to even welding. Partial scorching, in particular at the surface of the particle foam part, may thus be avoided reliably. In conventional methods, if skinning-over occurs, the steam cannot flow further. This is problematic especially if pressure and therefore temperature rise in this area, so that the surface of the particle foam part is partly scorched. Since, with the present invention, pressure and therefore temperature follow a defined function, these problems known from the prior art cannot occur.

LIST OF REFERENCE NUMBERS 1 apparatus
2 mold
3 mold cavity
4 filling injector
5 connection
6 punch
7 first steam chamber
8 second steam chamber
9 nozzle
10 feed pipe
11 feed pipe
12 steam generator
13 steam valve
14 steam valve
15 pressure sensor
16 pressure sensor
17 distribution channel
18 opening
19 condensate pipe
20 condensate pipe
21 condensate valve
22 condensate pipe
23 control device

The invention claimed is:
1. A method for the production of a particle foam part comprising the following:
feeding foam particles into a mold cavity of a mold while applying a partial vacuum to the mold, wherein polyurethane-based (eTPU) foam particles are used; and
thermoplasticly welding the foam particles in the mold to form a particle foam part, under a supply of steam, as the steam is introduced in the mold, a partial vacuum is applied, wherein the pressure of the steam is initially fed at low pressure, which facilitates flow through the mold cavity and the expulsion of air while continuing to introduce steam with a ramp having an increasing rate that allows welding of the inner zone of the foam part before skinning over of the foam part can occur.
2. The method according to claim 1, comprising the following:
feeding foam particles into a mold cavity of a mold, wherein the foam particles are introduced into the mold either by crack split filling, pressure filling or counter-pressure filling; and
thermoplasticly welding the foam particles in the mold to form a particle foam part, under a supply of steam, wherein the pressure of the steam is increased gradually.
3. The method according to claim 2, comprising the following:
feeding foam particles into a mold cavity of a mold, wherein a mold is used which, in the closed state, has a volume of at least 0.5 m$^3$.
4. The method according to claim 3, wherein the pressure of steam increased during the ramp is varied at a mean rate of between 0.01 bar/s and 2 bar/s.
5. The method according to claim 4, wherein a mold is used which has two mold halves, with each mold half being encompassed by a separate steam chamber, and with steam being fed into each steam chamber by means of a steam valve connected to a control device, and fitted in each steam chamber or in a corresponding feed pipe is in each case a pressure sensor, which is connected to the control device, and each steam chamber has a condensate valve to take steam away from the steam chamber, wherein firstly steam is fed at low pressure to the first of the two mold halves via the corresponding first steam chamber the steam is initially fed, which facilitates flow through the mold cavity and the expulsion of air while continuing to introduce steam at a rate that allows welding of the inner zone of the foam part before skinning over of the foam part can occur and at the second steam chamber the condensate valve is opened so that air expelled from the mold cavity may flow out and next, steam is fed to the second mold half via the second steam chamber the steam is initially fed, which facilitates flow through the mold cavity and the expulsion of air while continuing to introduce steam at a rate that allows welding of the inner zone of the foam part before skinning over of the foam part can occur and the condensate valve in the first steam chamber is opened so that air expelled from the mold cavity can flow away.
6. The method according to claim 5, wherein for crack steaming and/or for rinsing or cross-steaming of the mold cavity and/or for autoclaving of the foam particles present in the mold cavity, steam is fed to the mold cavity, with the pressure of the steam which facilitates flow through the mold cavity and the expulsion of air while continuing to introduce steam at a rate that allows welding of the inner zone of the foam part before skinning over of the foam part can occur.
7. The method according to claim 6, wherein the ramp is a linear rising ramp, a single or multiple curved ramp, a stepped, a parabolic or an exponentially rising ramp.
8. The method according to claim 7, wherein the foam particles are fed to the mold with the addition of water, in particular under a supply of steam.
9. The method according to claim 3, wherein the pressure of steam increased during the ramp is varied at a mean rate of between 0.01 bar/s and 2 bar/s.
10. The method for the production of a particle foam part according to claim 1, comprising the following:
feeding foam particles into a mold cavity of a mold, wherein a mold is used which, in the closed state, has a volume of at least 0.5 m$^3$.
11. The method according to claim 1 wherein a mold is used which has two mold halves, with each mold half being encompassed by a separate steam chamber, and with steam being fed into each steam chamber by means of a steam valve connected to a control device, and fitted in each steam chamber or in a corresponding feed pipe is in each case a pressure sensor, which is connected to the control device, and each steam chamber has a condensate valve to take steam away from the steam chamber, wherein firstly steam is fed to the first of the two mold halves via the corresponding first steam chamber, which facilitates flow through the mold cavity and the expulsion of air while continuing to introduce steam at a rate that allows welding of the inner zone of the foam part before skinning over of the foam part can occur and at the second steam chamber the condensate valve is opened so that air expelled from the mold cavity may flow out and next, steam is fed to the second mold half via the second steam chamber, which facilitates flow through the mold cavity and the expulsion of air while continuing to introduce steam at a rate that allows welding of the inner zone of the foam part before skinning over of the foam part can occur and the condensate valve in the first steam chamber is opened so that air expelled from the mold cavity can flow away.

12. The method according to claim 1, wherein for crack steaming and/or for rinsing or cross-steaming of the mold cavity and/or for autoclaving of the foam particles present in the mold cavity, steam is fed to the mold cavity.

13. The method according to claim 1, wherein the ramp is a linear rising ramp, a single or multiple curved ramp, a stepped, a parabolic or an exponentially rising ramp.

14. The method according to claim 1, wherein the foam particles are fed to the mold with the addition of water, in particular under a supply of steam.

\* \* \* \* \*